United States Patent
Kim

(10) Patent No.: US 12,420,861 B2
(45) Date of Patent: Sep. 23, 2025

(54) ELECTRONIC CONTROL STEERING SYSTEM AND DRIVING METHOD THEREOF

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 482 days.

(21) Appl. No.: 18/076,397

(22) Filed: Dec. 7, 2022

(65) Prior Publication Data

US 2023/0174145 A1 Jun. 8, 2023

(30) Foreign Application Priority Data

Dec. 8, 2021 (KR) .................. 10-2021-0174594

(51) Int. Cl.

| | |
|---|---|
| B62D 5/04 | (2006.01) |
| B60W 60/00 | (2020.01) |
| B62D 1/04 | (2006.01) |
| B62D 1/181 | (2006.01) |
| B62D 1/183 | (2006.01) |
| B62D 15/02 | (2006.01) |

(52) U.S. Cl.
CPC .......... *B62D 5/0484* (2013.01); *B62D 1/183* (2013.01); *B62D 5/049* (2013.01); *B62D 15/021* (2013.01); *B60W 60/0053* (2020.02); *B62D 1/04* (2013.01); *B62D 1/181* (2013.01)

(58) Field of Classification Search
CPC . B60W 20/50; B60W 60/0053; B62D 5/0484; B62D 5/048; B62D 1/04; B62D 1/181; B62D 1/183; B62D 15/021
See application file for complete search history.

(56) References Cited

U.S. PATENT DOCUMENTS

| | | | | |
|---|---|---|---|---|
| 1,847,209 | A * | 3/1932 | Bolinas, Jr. | .......... B60R 25/0224 |
| | | | | 74/555 |
| 5,135,069 | A * | 8/1992 | Hattori | ...................... B62D 6/00 |
| | | | | 180/407 |
| 5,835,870 | A * | 11/1998 | Kagawa | .................... B62D 1/28 |
| | | | | 701/41 |
| 8,204,651 | B2 * | 6/2012 | Tachibana | ............ B62D 5/0475 |
| | | | | 324/426 |
| 9,643,642 | B2 * | 5/2017 | Kuramochi | ............ B62D 6/008 |
| 10,146,357 | B2 * | 12/2018 | Bendewald | .......... B60W 30/16 |

(Continued)

*Primary Examiner* — Timothy Wilhelm
(74) *Attorney, Agent, or Firm* — WOMBLE BOND DICKINSON (US) LLP

(57) ABSTRACT

Disclosed is an electronic control steering system according to various exemplary embodiments of the present disclosure, which includes: a folding device driven to enable folding of a steering wheel in a driving state of a vehicle an auto folding mode; a first power supply unit supplying power to the folding device; a first angle sensor electrically connected to the first power supply unit; a second power supply unit distinguished from the first power supply unit and supplying power to a second angle sensor; and a control unit controlling steering of the vehicle through the first angle sensor or the second angle sensor, in which when the power supplying from the first power supply unit is interrupted, the control unit may switch the auto folding mode to a manual folding mode so as to manually release the folding of the steering wheel.

9 Claims, 2 Drawing Sheets

(56) References Cited

U.S. PATENT DOCUMENTS

| | | | |
|---|---|---|---|
| 10,343,555 B2* | 7/2019 | Tan | B60N 2/22 |
| 10,442,455 B2* | 10/2019 | McKinzie | B62D 1/181 |
| 10,562,558 B1* | 2/2020 | Spahn | B62D 1/10 |
| 10,569,799 B2* | 2/2020 | Kim | B62D 1/181 |
| 10,654,511 B1* | 5/2020 | Cao | B62D 1/04 |
| 10,717,412 B2* | 7/2020 | Abel Rayan | B60R 25/31 |
| 11,148,701 B2* | 10/2021 | Schmidt | B62D 1/08 |
| 11,214,293 B2* | 1/2022 | Nishimura | B62D 1/187 |
| 11,225,226 B1* | 1/2022 | Kim | G05G 1/44 |
| 11,440,577 B2* | 9/2022 | Edamoto | B62D 1/183 |
| 11,453,429 B2* | 9/2022 | Helmstetter | B62D 1/04 |
| 11,518,426 B2* | 12/2022 | Park | B62D 1/183 |
| 11,904,960 B2* | 2/2024 | Lee | B62D 1/187 |
| 11,952,033 B2* | 4/2024 | Kim | B62D 1/06 |
| 11,987,297 B2* | 5/2024 | Min | B62D 5/0454 |
| 12,054,084 B2* | 8/2024 | Harmon | F16D 65/46 |
| 12,083,972 B2* | 9/2024 | Barritault | B62D 1/04 |
| 12,233,967 B2* | 2/2025 | Kim | B62D 1/183 |
| 12,280,819 B2* | 4/2025 | Kim | B62D 1/10 |
| 2017/0297606 A1* | 10/2017 | Kim | B62D 1/185 |
| 2018/0154921 A1* | 6/2018 | Bonello | B62D 1/06 |
| 2019/0071113 A1* | 3/2019 | Board | B62D 1/14 |
| 2019/0084609 A1* | 3/2019 | Rogers | B62D 1/10 |
| 2019/0176868 A1* | 6/2019 | Kreutz | B62D 1/08 |
| 2019/0299909 A1* | 10/2019 | Alexander | B62D 1/183 |
| 2020/0269900 A1* | 8/2020 | Kawaguchi | B62D 1/06 |

* cited by examiner

ELECTRONIC CONTROL STEERING SYSTEM AND DRIVING METHOD THEREOF

CROSS-REFERENCE TO RELATED APPLICATION

This application claims priority under 35 U.S.C. § 119 to Korean Patent Application No. 10-2021-0174594, filed on Dec. 8, 2021, in the Korean Intellectual Property Office (KIPO), the disclosure of which is incorporated by reference herein in its entirety.

TECHNICAL FIELD

The present disclosure relates to an electronic control steering system and a driving method thereof.

BACKGROUND

In recent autonomous vehicles, an electronic control steering system which is a steering system through an electrical connection that excludes a physical connection between a steering wheel and a vehicle axle is being applied.

In addition, there is a trend that a foldable system is applied to the steering wheel to be foldable according to an autonomous driving situation.

With the recent electrification of the steering system, an electric steering system operates by receiving power from a battery from a vehicle, and according to the UN ECE law, it is defined that steering should be possible in spite of one failure of an energy source.

In preparation for this, in the autonomous vehicle, a battery for the steering system is dualized.

However, the foldable system has a problem in that dualization is difficult in preparation for occurrence of abnormalities by considering an importance of a function, cost, and a size.

SUMMARY

In view of the above, the present disclosure provides an electronic control steering system capable of steering even when an abnormality occurs in a battery, and a driving method thereof.

The present disclosure provides an electronic control steering system which includes: a folding device driven to enable folding of a steering wheel in a driving state of a vehicle an auto folding mode; a first power supply unit supplying power to the folding device; a first angle sensor electrically connected to the first power supply unit; a second power supply unit distinguished from the first power supply unit and supplying power to a second angle sensor; and a control unit controlling steering of the vehicle through the first angle sensor or the second angle sensor, in which when the power supplying from the first power supply unit is interrupted, the control unit may switch the auto folding mode to a manual folding mode so as to manually release the folding of the steering wheel.

Preferably, when the power is supplied to the folding device, the control unit may maintain the folding device in a locking state in the state in which the steering wheel is folded.

Preferably, when the power supplying to the folding device is interrupted, the control unit may switch the auto folding mode to the manual folding mode by releasing the locking state of the folding device.

Preferably, the control unit may control the steering of the vehicle according to a signal input from the second angle sensor in the manual folding mode.

Preferably, when the signal is input from each of the first angle sensor and the second angle sensor, the control unit may control the steering of the vehicle according to the signal input from the first angle sensor.

Preferably, when the power supplying from the first power supply unit or the second power supply unit is interrupted, the control unit may generate an alarm.

The present disclosure provides a driving method of an electronic control steering system which may include: when a steering wheel is folded in an auto folding mode, controlling a folding device of the steering wheel in a locking state; determining whether a first power supply unit supplying power to the folding device of the steering wheel is abnormal; and switching the auto folding mode to a manual folding mode by releasing the locking state of the folding device when the power supplying from the first power supply unit to the folding device is interrupted.

Preferably, in the auto folding mode, steering is controlled by using a first angle sensor to which the power is supplied by the first power supply unit, and in the manual folding mode, the steering may be controlled by using a second angle sensor to which the power is supplied by a second power supply unit provided apart from the first power supply unit.

Preferably, the driving method may further include determining whether the second power supply unit is abnormal when the power is supplied from the first power supply unit to the folding device, and when the power supplying from the second power supply unit to the second angle sensor is interrupted, an alarm may be generated.

Advantageous Effects

According to various exemplary embodiments of the present disclosure, an electronic control steering system is capable of normal steering even though an abnormality occurs in one battery.

Further, an angle sensor is dualized to minimize an increase in size and cost.

DETAILED DESCRIPTION

Figure 1:
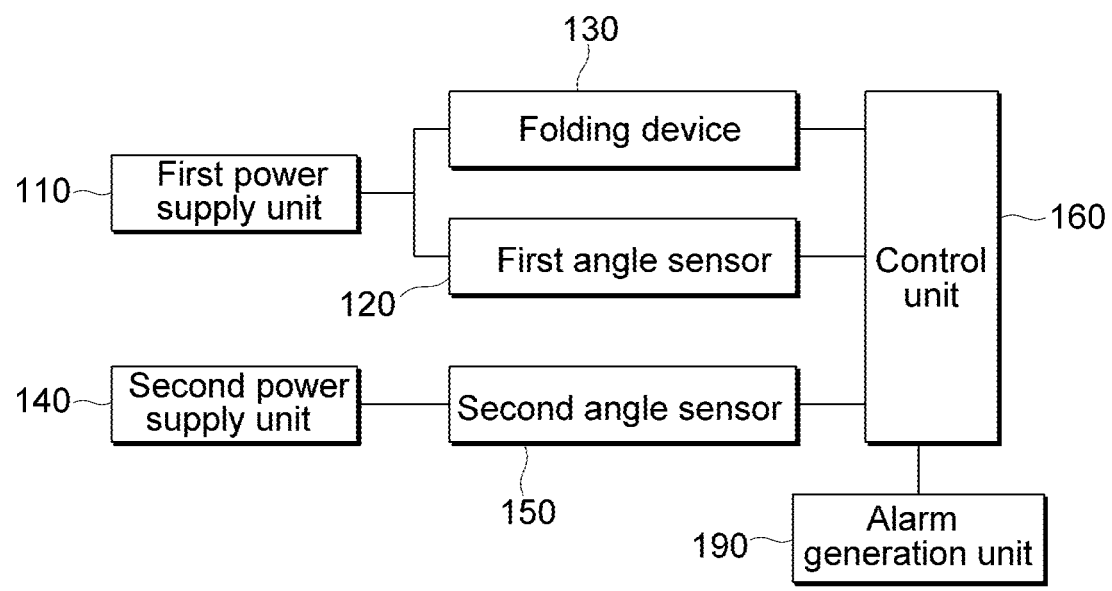
FIG. 1 is a block diagram schematically illustrating a relationship between components of an electronic control steering system according to various exemplary embodiments of the present disclosure.

Hereinafter, some exemplary embodiments of the present disclosure will be described through exemplary diagrams for convenience of description. When reference numerals refer to components of each drawing, although the same components are illustrated in different drawings, the same components are denoted by the same reference numerals as possible.

Terms or words used in the present specification and claims should not be interpreted as being limited to typical or dictionary meanings, but should be interpreted as having meanings and concepts which comply with the technical spirit of the present disclosure, based on the principle that an inventor can appropriately define the concept of the term to describe his/her own invention in the best manner. In describing the components of the exemplary embodiments of the present disclosure, terms including first, second, A, B, (a), (b), and the like may be used. These terms are just intended to distinguish the components from other components, and the terms do not limit the nature, sequence, or order of the components. When it is disclosed that any component is "connected" or "coupled" to other components, it should be understood that the component may be directly connected or linked to other components, but another component may be "connected" or "coupled" between the component and another component.

Accordingly, configurations illustrated in the drawings and exemplary embodiments disclosed in the present specification are only the most preferred embodiment of the present disclosure and do not represent all of the technical spirit of the present disclosure, and thus it is to be understood that various equivalents and modified examples, which may replace the configurations, are possible when filing the present application. Further, the detailed description of publicly-known function and configuration that may make the gist of the present disclosure unnecessarily ambiguous will be omitted.

An electronic control steering system proposed by the present disclosure may be applied to an electric vehicle driven by an electric motor, but is not limited thereto.

Further, the electronic control steering system proposed by the present disclosure may be applied to a steering system configured by an electronic control scheme in which a steering wheel manipulated by a driver and a steering motor steering a wheel of a vehicle are electrically connected, and the steering motor is driven according to a rotational angle of the steering wheel to perform steering of the vehicle Since the steering system of the electronic control scheme may use any known method, a detailed description here is omitted.

Hereinafter, the electronic control steering system according to various exemplary embodiments of the present disclosure will be described in detail with reference to the accompanying drawings.

Figure 2:
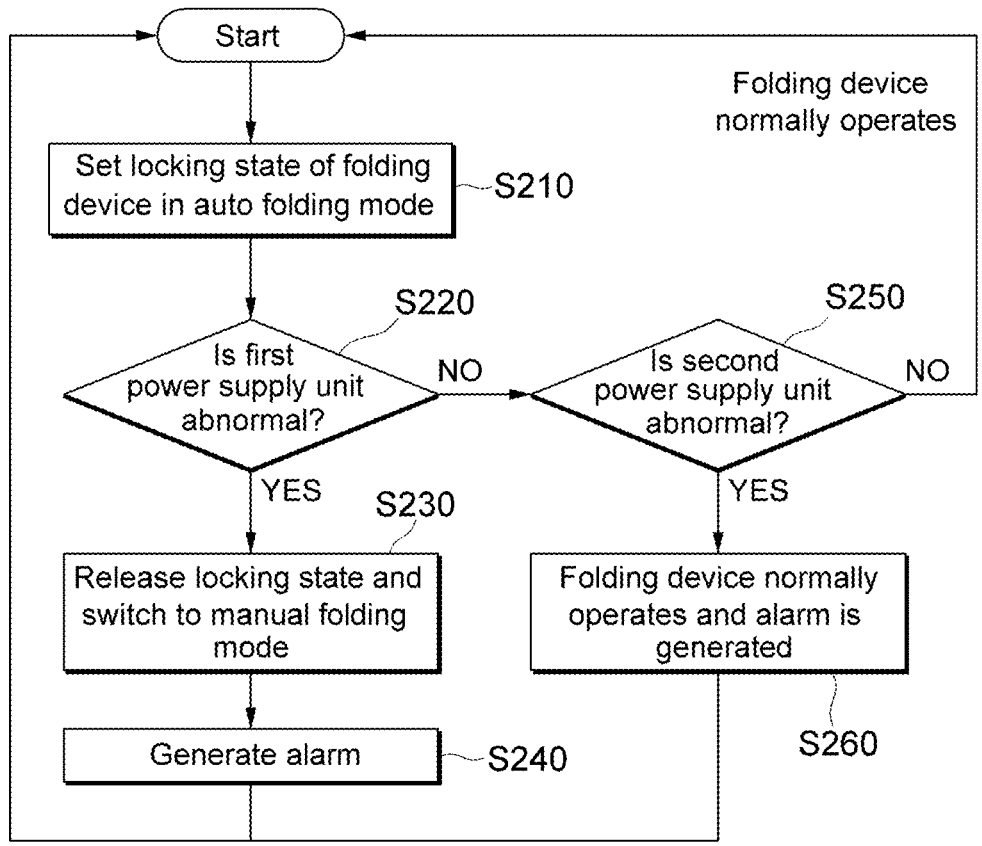
FIG. 2 is a flowchart illustrating a driving method of an electronic control steering system according to various exemplary embodiments of the present disclosure.

FIG. 1 is a block diagram schematically illustrating a relationship between components of an electronic control steering system according to various exemplary embodiments of the present disclosure and FIG. 2 is a flowchart illustrating a driving method of an electronic control steering system according to various exemplary embodiments of the present disclosure.

Referring to FIG. 1, the electronic control steering system according to various exemplary embodiments of the present disclosure which relates to an electronic control steering system capable of steering even at the time of the abnormality of a battery in a steering system including a foldable system of a steering wheel may include a first power supply unit 110, a second power supply unit 140, a folding device 130, a first angle sensor 120, a second angle sensor 150, and a control unit 160. Further, the electronic control steering system may further include an alarm generation unit 190 that generates an alarm when the first power supply unit 110 or the second power supply unit 140 is abnormal.

The first power supply unit 110 and the second power supply unit 140 may be batteries for the steering system, which are provided apart from a driving motor battery for the steering system. A general electric vehicle may include a driving battery providing power to a driving motor driving a wheel for driving and an electrical battery providing the power to electronic equipment applied to the vehicle. The driving battery uses high voltage of approximately 360 to 720 V, but the high voltage may be harmful to the human body, so the electrical battery uses voltage of 60 V or less and generally adopts a battery of 12 or 24 V.

The first power supply unit 110 and the second power supply unit 140 of the present disclosure may include a battery of 12 or 24 V provided apart from the driving battery in order to provide the power to the steering system.

In the present disclosure, each of the first power supply unit 110 and the second power supply unit 140 may be separately provided. The first power supply unit 110 and the second power supply unit 140 may be barriers for supplying the power to the steering system electrically controlled in the present disclosure.

As described above, in order to meet a law for the steering system determined by the ECE, since the steering should be possible even though the abnormality occurs in a power supply, the battery is dualized in preparation for the abnormality of one battery in the present disclosure.

The first power supply unit 110 may supply the power to the folding device 130 controlling the steering wheel to be foldable. The first power supply unit 110 is electrically connected to the first angle sensor 120 that senses the rotational angle of the steering wheel by the manipulation by the driver to supply the power. However, the foldable device has a problem in that dualization is difficult in preparation for occurrence of abnormalities of the battery by considering an importance of a function, cost, and a size.

The second power supply unit 140 may be provided apart from the first power supply unit 110 so as to supply the power to the steering system. The second power supply unit 140 is electrically connected to the second angle sensor 150 that senses the rotational angle of the steering wheel by the manipulation by the driver to supply the power to the second angle sensor 150.

In the present disclosure, only one folding device 130 is provided, which is connected to the first power supply unit 110 to supply the power, and instead, may dualize and include the angle sensor sensing the rotation angle of the steering wheel.

The folding device 130 is installed at one side of the steering wheel provided to be foldable to control the steering wheel to be foldable. The folding device 130 is electrically connected to the first power supply unit 110 to receive the power, and may fold the steering wheel or release the folding according to a driving state of the vehicle.

The folding device 130 may be driven in an auto folding mode or a manual folding mode.

In the auto folding mode, the folding device 130 may be driven so that the steering wheel is folded when the driving state of the vehicle is a state in which an autonomous driving switch is on or a state in which the start of the vehicle is off in a state in which the power is normally supplied from the first power supply unit 110. Alternatively, in the auto folding mode, the folding device 130 may be driven so that the folding of the steering wheel is released when the autonomous driving switch of the vehicle is off.

In the present disclosure, the folding device 130 may be set to a locking state in which when the steering wheel is folded as the driving state of the vehicle is the state in which the autonomous driving switch is on or the state which the start of the vehicle is off in the auto folding mode, the steering wheel is maintained in the folding state. In the state in which the folding device 130 is set to the locking state, the power may be continuously supplied to the folding device 130 from the first power supply unit 110 so that the steering wheel maintains the folding state, and a manual manipulation by the driver may be impossible.

In the manual folding mode, the power supplied from the first power supply unit 110 to the folding device 130 is interrupted, so the locking state of the folding device 130 may be released and the manual manipulation by the driver may be possible.

Meanwhile, each of the first angle sensor 120 and the second angle sensor 150 is installed at one side of the steering wheel to sense the rotational angle of the steering wheel. The first angle sensor 120 is connected to the first power supply unit 110 supplying the power to the folding device 130 to receive the power. The second angle sensor 150 is connected to the second power supply unit 140 provided apart from the first power supply unit 110 to receive the power.

The control unit 160 may control the steering of the vehicle by using a signal input from the first angle sensor 120 or the second angle sensor 150. It will be apparent that a method for controlling the steering of the driving wheel by using a sensing signal of the angle sensor may be applied to any known method.

In the present disclosure, the control unit 160 may determine whether the first power supply unit 110 and the second power supply unit 140 are abnormal.

In an exemplary embodiment, if the power is supplied from the first power supply unit 110 to the folding device 130 when the first power supply unit 110 is normal, the control unit 160 may control the folding device 130 to be driven in the auto folding mode. The control unit 160 may control the vehicle wheel to be folded according to the driving state of the vehicle in the auto folding mode. Further, when the power is supplied from the first power supply unit 110 to the folding device 130 and the folding device 130 is driven in the auto folding mode, the control unit 160 may set and maintain the folding device 130 in the locking state in order to prevent mis-manipulation in the state in which the steering wheel is folded. In this state, since the power for folding driving of the folding device 130 is continuously supplied from the first power supply unit 110, the folding release of the steering wheel by the manual manipulation by the driver may be impossible. The control unit 160 may control the steering of the vehicle by using a sensing result signal input from the first angle sensor 120 in the state in which the power is normally supplied from the first power supply unit 110.

In an exemplary embodiment, when the abnormality occurs in the first supply unit 110 and the power supplying to the folding device 130 from the first power supply unit 110 is interrupted, the control unit 160 may switch the auto folding mode to the manual folding mode so as to enable the folding release through the manual manipulation of the steering wheel. When the power supplying from the first power supply unit 110 to the folding device 130 is interrupted, the control unit 160 may switch the auto folding mode to the manual folding mode by releasing the locking state of the folding device 130. Since the manual folding mode is the state in which the power supplying from the first power supply unit 110 is interrupted, the control unit 160 may control the steering of the vehicle according to the signal input from the second angle sensor 150 in the manual folding mode.

In the present disclosure, since each of the first power supply unit 110 and the second power supply unit 140 for the steering system is provided, and the first angle sensor 120 and the second angle sensor 150 connected to the first power supply unit 110 and the second power supply unit 140, respectively, are provided, the control unit 160 may control the steering by selectively using the input signal input from the first angle sensor 120 or the second angle sensor 150. In an exemplary embodiment, when the abnormality occurs in any one of the first power supply unit 110 or the second power supply unit 140, and the power supplying is interrupted, the control unit 160 is connected to the normal power supply unit to control the steering by using the angle sensor into which the signal is input. Further, when both the first power supply unit 110 and the second power supply unit 140 are normal, the control unit 160 may control the steering of the vehicle by using the signal input from the first angle sensor 120.

Further, in the present disclosure, the electronic control steering system may further include an alarm generation unit 190 generating an alarm when the first power supply unit 110 or the second power supply unit 140 are abnormal and the power supplying is thus interrupted. When the power supplying to the folding device 130 from the first power supply unit 110 is interrupted, and the auto folding mode is switched to the manual folding mode as described above, the control unit 160 may control the alarm generation unit 190 to generate the alarm for the alarm occurrence of the first power supply unit 110.

Meanwhile, when the first power supply unit 110 is in a normal state, but the abnormality occurs in the second power supply unit 140, the control unit 160 drives the folding device 130 in the auto folding mode, and controls the steering of the vehicle by using the first angle sensor 120. In this case, the control unit 160 may control the alarm generation unit 190 to generate the alarm for the abnormality occurrence of the second power supply unit 140.

Next, a driving method of the electronic control steering system will be described with reference to FIG. 2.

First, the driving method may include an operation (S210) of controlling the folding device 130 of the steering wheel in the locking state. As described above, since the electronic control steering system is driven in the auto folding mode in the state in which the power is normally supplied to the folding device 130 by the first power supply unit 110 in the state in which the power supply unit 110 is normal, the control unit 160 controls the folding device 130 to be maintained in the locking state when the steering wheel is folded according to the driving state of the vehicle in the auto folding mode.

Next, the driving method may include an operation (S220) of determining whether the first power supply unit 110 supplying the power to the folding device 130 of the steering wheel by the control unit 160 is abnormal.

The driving method may include an operation (S230) in which when the abnormality occurs in the first power supply unit 110 and the power supplying from the first power supply unit 110 to the folding device 130 is thus interrupted, the control unit 160 switches the auto folding mode to the manual folding mode by releasing the locking state of the folding device 130. Further, when the abnormality occurs in the first power supply unit, the control unit may generate the alarm (S240).

As described above, in the auto folding mode, steering is controlled by using a first angle sensor 120 to which the power is supplied by the first power supply unit 110, and in the manual folding mode, the steering is controlled by using a second angle sensor 150 to which the power is supplied by a second power supply unit 140 provided apart from the first power supply unit 110.

In various exemplary embodiments of the present disclosure, the driving method may further include an operation (S250) of determining whether the second power supply unit 140 is abnormal when the power is normally supplied to the folding device 130 from the first power supply unit 110. In this process, when the abnormality occurs in the second power supply unit 140 and the power supplying to the second angle sensor 150 is interrupted, the control unit 160 may generate the alarm for the abnormality of the second power supply unit 140.

As described above, in the present disclosure, when the abnormality occurs in the first power supply unit 110, the auto folding mode is switched to the manual folding mode to release the folding of the steering wheel through the manual manipulation of the driver, thereby enabling normal steering. Further, since the angle sensors connected to the first power supply unit 110 and the second power supply unit 140, respectively, are provided, even though the abnormality occurs in the first power supply unit 110, normal steering may be enabled by using the second angle sensor 150 to which the power is supplied through the second power supply unit 140.

Hereinabove, even if it is described that all of constituent elements constituting the exemplary embodiment of the present disclosure are coupled as a single unit or coupled to be operated as a single unit, the present disclosure n is not necessarily limited to the exemplary embodiment. That is, among the components, one or more constituent elements may be selectively coupled to be operated within the scope of the object of the present disclosure. Unless explicitly described to the contrary, since the word "include", "constitute", or "have" implies the inclusion of stated elements, it may be analyzed that the word "include", "constitute", or "have" means not the exclusion of any other elements but further inclusion of any other elements. Further, if not contrarily defined, all terms used herein including technological or scientific terms have the same meanings as those generally understood by a person with ordinary skill in the art. A generally used terminology which is defined in a dictionary should be interpreted to be equal to a contextual meaning of the related technology but is not interpreted to have an ideal or excessively formal meaning, if it is not apparently defined in the present disclosure.

The above description just illustrates the technical spirit of the present disclosure and various changes and modifications can be made by those skilled in the art to which the present disclosure pertains without departing from an essential characteristic of the present disclosure. Accordingly, the exemplary embodiments disclosed herein are intended to not limit but describe the technical spirit of the present disclosure but the scope of the technical spirit of the present disclosure is not limited by the exemplary embodiments. The protective scope of the present disclosure should be construed based on the following claims, and all the technical concepts in the equivalent scope thereof should be construed as falling within the scope of the present disclosure.

DETAILED DESCRIPTION OF MAIN ELEMENTS

110: First power supply unit
120: First angle sensor
130: Folding device
140: Second power supply unit
150: Second angle sensor
160: Control unit
190: Alarm generation unit

What is claimed is:

1. An electronic control steering system comprising:
    a folding device driven to enable folding of a steering wheel in a driving state of a vehicle an auto folding mode;
    a first power supply unit supplying power to the folding device;
    a first angle sensor electrically connected to the first power supply unit;
    a second power supply unit distinguished from the first power supply unit and supplying power to a second angle sensor; and
    a control unit controlling steering of the vehicle through the first angle sensor or the second angle sensor,
    wherein when the power supplying from the first power supply unit is interrupted, the control unit switches the auto folding mode to a manual folding mode so as to manually release the folding of the steering wheel.

2. The electronic control steering system of claim 1, wherein when the power is supplied to the folding device, the control unit maintains the folding device in a locking state in the state in which the steering wheel is folded.

3. The electronic control steering system of claim 2, wherein when the power supplying to the folding device is interrupted, the control unit switches the auto folding mode to the manual folding mode by releasing the locking state of the folding device.

4. The electronic control steering system of claim 1, wherein the control unit controls the steering of the vehicle according to a signal input from the second angle sensor in the manual folding mode.

5. The electronic control steering system of claim 1, wherein when a signal is input from each of the first angle sensor and the second angle sensor, the control unit controls the steering of the vehicle according to the signal input from the first angle sensor.

6. The electronic control steering system of claim 1, wherein when the power supplying from the first power supply unit or the second power supply unit is interrupted, the control unit generates an alarm.

7. A driving method of an electronic control steering system, the driving method comprising:
    when a steering wheel is folded in an auto folding mode, controlling a folding device of the steering wheel in a locking state;
    determining whether a first power supply unit supplying power to the folding device of the steering wheel is abnormal; and
    switching the auto folding mode to a manual folding mode by releasing the locking state of the folding device when the power supplying from the first power supply unit to the folding device is interrupted.

8. The driving method of claim 7, wherein in the auto folding mode, steering is controlled by using a first angle sensor to which the power is supplied by the first power supply unit, and in the manual folding mode, the steering is controlled by using a second angle sensor to which the power is supplied by a second power supply unit provided apart from the first power supply unit.

9. The driving method of claim 8, further comprising:
    determining whether the second power supply unit is abnormal when the power is supplied from the first power supply unit to the folding device,
    wherein when the power supplying from the second power supply unit to the second angle sensor is interrupted, an alarm is generated.

* * * * *